United States Patent Office

3,578,473
Patented May 11, 1971

3,578,473
BASIC FUSED REFRACTORY WITH RARE EARTH OXIDE
Allen M. Alper and Robert N. McNally, Corning, N.Y., assignors to Corhart Refractories Company, Louisville, Ky.
No Drawing. Filed May 17, 1968, Ser. No. 729,894
Int. Cl. C04b *35/40*
U.S. Cl. 106—58                        5 Claims

ABSTRACT OF THE DISCLOSURE

Basic fused refractory material analytically composed of, by weight, at least 70% MgO, 1 to 25% rare earth oxide, 0 to 20% FeO, 0 to less than 15% of $TiO_2$, $ZrO_2$, $Cr_2O_3$ and mixtures thereof, 0 to less than 10% of $SiO_2$, $Al_2O_3$, $B_2O_3$, fluorine and mixtures thereof, 0 to 3.5% $P_2O_5$, and 0 to 3% $ThO_2$. Material can be in form of either fused cast articles or fused grain or rebonded fused grain article.

BACKGROUND OF THE INVENTION

The invention is concerned with completely melted and resolidified basic refractory raw material that yields a fused product or material especially suitable for forming the inside working linings of basic oxygen steelmaking furnaces. For this purpose, the fused product or material can be made as fused cast monolithic articles (castings) or as fused grain that can be rebonded to form bricks or other structural bodies.

Up to the present time, the principal basic fused refractory material employed for lining basic oxygen steelmaking furnaces (BOF's) has been fused cast bricks or blocks made from mixtures of mainly magnesia and chrome ore (e.g. see U.S. Pat. 3,272,490). However, there has been a strong continuing desire by operators of BOF's for refractory material with further improved performance characteristics, such as greater resistance to corrosion-erosion by the high lime-to-silica ratio molten basic slags (BOF slags) that repeatedly wash against the refractory lining in a highly agitated manner.

SUMMARY OF THE INVENTION

We have now discovered a unique basic fused refractory material containing rare earth oxide that exhibits much superior resistance to corrosion-erosion by BOF slag than that of the hitherto commercially employed fused cast mixtures of magnesia and chrome ore. In the broadest sense, our new refractory material is analytically composed of, by weight, at least 75% MgO, 1 to 25% rare earth oxide, 0 to 20% FeO, 0 to less than 15% of $TiO_2$, $ZrO_2$, $Cr_3O_3$ and mixtures thereof, 0 to less than 10% of $SiO_2$, $Al_2O_3$, $B_2O_3$ and mixtures thereof, 0 to 3.5% $P_2O_5$, and 0 to 3% $ThO_2$. Nevertheless, from the viewpoint of most significant technical and commercial importance, we define our new refractory material as analytically composed of, by weight, at least 85% MgO, 1 to less than 15% rare earth oxide, 0 to less than 10% of FeO, $TiO_2$, $ZrO_2$, $Cr_2O_3$ and mixtures thereof, 0 to less than 5% of $SiO_2$, $Al_2O_3$, $B_2O_3$, fluorine and mixtures thereof, to 3.5% $P_2O_5$, and 0 to 3% $ThO_2$. In either of the above cases, of course, the product material will also usually include minor incidental impurities normally associated with suitable raw materials, such as good refractory grade magnesia, bastnesite concentrate and/or high quality monazite sand.

As used herein, "rare earth oxide" means oxide of one or more of the metallic rare earth elements of Group III having an atomic number of 21, 39 and 57 through 71.

Fused refractory material of this invention is produced by any suitable procedure. Melting can be done by the most usual manner of initially forming a small pool within a mass of raw material and then further melting the raw material mass by means of electric current flowing through the pool between electrodes. Alternatively, other melting means can be employed, such as an electrical induction melting furnace. After a suitable molten mass has been formed, it is then solidified in a mold or molds to provide the desired shaped fused cast article or articles, or it is formed into grain by comminuting or atomizing a stream of the molten mass or by crushing a solidified mass.

DESCRIPTION OF THE PREFERRED EMBODIMENTS

As will be apparent from the illustrative examples given hereinafter we prefer to limit the amount of certain optional consituents to avoid less desirable phases and/or effects or, in other words, to insure optimum properties for the fused refractory material in relation to the corrosive-erosion molten basic slag environment of a BOF. Specifically, the sum of FeO plus $TiO_2$ plus $ZrO_2$ should be less than 1%, the sum of $SiO_2$ plus $Al_2O_3$ plus $B_2O_3$ plus fluorine should be less than 2%, and the sum of other miscellaneous incidental impurities should not exceed 1%. Also, best corrosion resistance is secured by avoiding or eliminating $P_2O_5$ and $ThO_2$ other than as negligible incidental impurity amounts totaling not more than 0.1%.

EXAMPLES 1–3

Three electrically melted and solidified bodies of fused refractory materials according to our invention were made and tested for BOF slag corrosion along with a sample body of commercial fused cast chrome-magnesia refractory having the following typical analysis, by weight, 58% MgO, 12% FeO, 19% $Cr_2O_3$, 7% $Al_2O_3$, 0.5% $TiO_2$, 2.2% $SiO_2$, 1% CaO and 0.3% fluorine. The three example bodies of this invention were made from a raw material mixture of calcined magnesia and either a leached concentrate of bastnesite or a monazite sand, which raw materials have the following typical analyses, by weight:

98.51% MgO, 0.86% CaO, 0.28% $SiO_2$, 0.22% $Fe_2O_3$, 0.13% loss on ignition.

Leached bastnesite concentrate—73.16% rare earth oxide, 2.9% $BaSO_4$, 0.3–0.5% CaO, 0.3–0.5% $SiO_2$, 5.0–5.5% fluorine, 0.1% $ThO_2$, 0.3% $Fe_2O_3$, 0.2% $P_2O_5$, 20–21% loss on ignition (rare earth oxide components as percentage of total rare earth oxide: 52–55% $CeO_2$, 27–28% $La_2O_3$, 4.3–4.8% $Pr_6O_{11}$, 11.5–14.0% $Nd_2O_3$, 0.7–08% $Sm_2O_3$, 0.15–0.18% $Eu_2O_3$, 0.2–0.3% $Gd_2O_3$, ca 0.1% $Y_2O_3$, ca. 0.2% other heavy rare earth oxides).

Monazite sand—58.39% rare earth oxide, 27.58% $P_2O_5$, 4.49% $ThO_2$, 2.55% $ZrO_2$, 1.74% $SiO_2$, 1.02% $Al_2O_3$, 0.3% $Fe_2O_3$, 0.01% $MnO_2$, 0.1% PbO, 0.1% MgO, 0.05% $TiO_2$, 0.03% CaO, 0.002% CuO (rare earth oxide, 2.9% $BaSO_4$, 0.3–0.5% CaO, 0.3–0.5% $SiO_2$, 5.0–sand: 20–25% $CeO_2$, 12–15% $La_2O_3$, 10–12% $Nd_2O_3$, 1.5–3% $Y_2O_3$, ca. 3% $Gd_2O_3$, ca 0.05% $Yb_2O_3$).

The batch mixture proportions and the calculated approximate fused product analyses (based on approximate volatilization loss of 20% of fluorine and 50% of $P_2O_5$) are given in the table in percent by weight.

TABLE

| Example No | 1 | 2 | 3 |
|---|---|---|---|
| Batch mixture composition (wt. percent): | | | |
| Magnesia | 95 | 75 | 80 |
| Bastnesite | 5 | 25 | |
| Monazite | | | 20 |
| Fused product analysis (wt. percent): | | | |
| MgO | 94.6 | 78.1 | 81.8 |
| REO [1] | 3.7 | 19.3 | 12.1 |
| FeO | 0.2 | 0.3 | 0.3 |
| $TiO_2 + ZrO_2$ | | | 0.5 |
| $SiO_2$ | 0.3 | 0.3 | 0.6 |
| $Al_2O_3$ | | | 0.2 |
| Fluorine | 0.2 | 1.0 | |
| $P_2O_5$ | | | 2.9 |
| $ThO_2$ | | | 0.9 |
| Others | 1.0 | 1.0 | 0.7 |
| Slag cut, percent | 17 | 19 | 31 |

[1] REO means all rare earth oxide.

The BOF slag corosion data for each example is also shown in the table. These data were derived from a test comprising placing 1½" x 1" x ½" specimen of each example body in a heated furnace having a predominantly CO atmosphere. At 1700° C. for about two hours or so, the specimens were passed, with one of their largest surfaces facing upward, through a downwardly directed stream of molten basic slag droplets at a substantially uniform rate of 72 times per hour until 2000 grams of slag were so employed. The slag had the following approximate batched composition, in percent by weight: 23.75% $Fe_2O_3$, 25.94% $SiO_2$, 40.86% CaO, 6.25% MgO and 3.20% $Al_2O_3$. At the end of the test, the average thickness of the specimen part most deeply cut by the slag was measured and compared with the original ½" thickness The data in the table express this comparison as a percentage change in thickness.

In contrast to the much greater slag corosion resistance (i.e. much lesser slag cut) of Examples 1-3, two samples of the commercial fused cast chrome-magnesia refractory exhibited slag cuts somewhat in exces of 46% and 54%, respectively.

Example 4

Illustrative of a fused material containing $Cr_2O_3$ according to this invention, which will give improved resistance to early BOF slag corrosion relative to the commercial fused cast chrome-magnesia refractory mentioned above, is one having the following approximate analysis (by weight) derived from melting a mixture of 90 wt. and batch mixture of Example No. 1 and 10 wt. percent of pure green chromic oxide: 85.1% MgO, 3.3% rare earth oxide, 0.2% FeO, 10.0% $Cr_2O_3$, 0.3% SiO, 0.2% fluorine, and 0.5% total incidental impurities. The early BOF slag does not have the very high lime-to-silica ratios and at least 5% $Cr_2O_3$ in our refractory material beneficially enhances corrosion resistance to such slag.

We claim:

1. Basic fused refractory material analytically composed of, by weight, at least 75% MgO, 1 to 25% rare earth oxide, 0 to 20% FeO, 0 to less than 15% of $TiO_2$, $ZrO_2$, $Cr_2O_3$ and mixtures thereof, 0 to less than 10% of $SiO_2$, $Al_2O_3$, $B_2O_3$, fluorine and mixtures thereof, 0 to 3.5% $P_2O_5$, and 0 to 3% $ThO_2$.

2. Basic fused refractory material of claim 1 wherein MgO is at least 85%, rare earth oxide does not exceed 15%, the amount of FeO, $TiO_2$, $ZrO_2$, $Cr_2O_3$ and mixtures thereof is less than 10%, and the amount of $SiO_2$, $Al_2O_3$, $B_2O_3$, fluorine and mixtures thereof is less than 5%.

3. Basic fused refractory material of claim 1 wherein the amount of FeO plus $TiO_2$ plus $ZrO_2$ is less than 1% and the amount of $SiO_2$ plus $Al_2O_3$ plus $B_2O_3$ plus fluorine is less than 2%.

4. Basic fused refractory material of claim 3 wherein the sum of $P_2O_5$ and $ThO_2$ is not more than 0.1%.

5. Basic fused refractory material of claim 1 wherein $Cr_2O_3$ is at least 5%.

References Cited

UNITED STATES PATENTS 3,293,053 12/1966 Alper et al. _____ 106—58
3,310,414 3/1967 Alper et al. _____ 106—58

JAMES E. POER, Primary Examiner

U.S. Cl. X.R.

106—57, 59

UNITED STATES PATENT OFFICE
CERTIFICATE OF CORRECTION

Patent No. 3,578,473      Dated May 11, 1971

Inventor(s) Allen M. Alper and Robert N. McNally

It is certified that error appears in the above-identified patent and that said Letters Patent are hereby corrected as shown below:

Column 1, line 53, change "$Cr_3O_3$" to -- $Cr_2O_3$ --.

Column 1, line 62, after "thereof," insert -- O --.

Column 2, line 50, change "$BasSO_4$" to -- $BaSO_4$ --.

Column 2, line 55, change "08%" to -- 0.8% --.

Column 2, line 61, delete in its entirety;

line 62, delete "sand:" and insert therefor --oxide components as a percentage of whole monazite sand: --.

Column 3, line 32, change "thickness" to -- thickness. --.

Column 4, line 4, after "90 wt." insert -- % --.

Column 4, line 7, change "$SiO$" to -- $SiO_2$ --.

Column 4, line 8, change "0.5%" to -- 0.9% --.

Signed and sealed this 11th day of January 1972.

(SEAL)
Attest:

EDWARD M. FLETCHER, JR.      ROBERT GOTTSCHALK
Attesting Officer            Acting Commissioner of Patents